US012620830B2

(12) United States Patent
Mouridsen

(10) Patent No.: US 12,620,830 B2
(45) Date of Patent: May 5, 2026

(54) BACKFEED PROTECTION CIRCUIT

(71) Applicant: SCHNEIDER ELECTRIC IT CORPORATION, Foxboro, MA (US)

(72) Inventor: Jonas Sonsby Mouridsen, Odense (DK)

(73) Assignee: SCHNEIDER ELECTRIC IT CORPORATION, Foxboro (MA)

( * ) Notice: Subject to any disclaimer, the term of this patent is extended or adjusted under 35 U.S.C. 154(b) by 687 days.

(21) Appl. No.: 18/147,797

(22) Filed: Dec. 29, 2022

(65) Prior Publication Data

US 2024/0223003 A1     Jul. 4, 2024

(51) Int. Cl.
*H02J 9/06*          (2006.01)

(52) U.S. Cl.
CPC .................................. *H02J 9/068* (2020.01)

(58) Field of Classification Search
CPC ....................................................... H02J 9/068
USPC ........................................................ 320/108
See application file for complete search history.

(56) References Cited

U.S. PATENT DOCUMENTS

RE43,177 E       2/2012  Paik et al.
9,431,853 B2 *  8/2016  Yeh .......................... H02J 9/062

9,979,218 B2       5/2018  Prakash
2006/0043792 A1 *  3/2006  Hjort ........................ H02J 9/062
                                                                              307/1
2014/0021789 A1 *  1/2014  Greer ........................ H02J 9/06
                                                                              307/64
2017/0353025 A1 *  12/2017  Phillips .................. H02H 3/003
2024/0186786 A1 *  6/2024  McHenry ............... H02H 3/003

FOREIGN PATENT DOCUMENTS

DE       3029094 A1    7/1981
EP       1976077 A2    10/2008
EP       3667693 A1    6/2020
EP       3806281 A1    4/2021
NL       8000047 A     8/1981

OTHER PUBLICATIONS

Extended European Search Report from corresponding European Application No. 23217244.5 dated Jul. 2, 2024.

* cited by examiner

*Primary Examiner* — Suchin Parihar
(74) *Attorney, Agent, or Firm* — FIG. 1 Patents

(57)          ABSTRACT

Examples of the disclosure include a power system including an input power connection, a return connection, a power converter having a converter input, a backfeed switch coupled between the input power connection and the converter input, at least one safety switch coupled between the converter input and the return connection, and at least one control circuit configured to control the at least one safety switch to be closed when the backfeed switch opens.

20 Claims, 6 Drawing Sheets

BACKFEED PROTECTION CIRCUIT

BACKGROUND

1. Field of the Disclosure

At least one example in accordance with the present disclosure relates generally to backfeed protection.

2. Discussion of Related Art

Power devices, such as uninterruptible power supplies (UPSs), may be used to provide regulated, uninterrupted power for sensitive and/or critical loads, such as computer systems and other data-processing systems. Existing UPSs include online UPSs, offline UPSs, line-interactive UPSs, as well as others. UPSs may provide output power to a load. The output power may be derived from a primary source of power, such as a utility-mains source, and/or derived from a back-up source of power, such as an energy-storage device.

SUMMARY

According to at least one aspect of the present disclosure, a power system is provided comprising an input power connection, a return connection, a power converter having a converter input, a backfeed switch coupled between the input power connection and the converter input, at least one safety switch coupled between the converter input and the return connection, and at least one control circuit configured to control the at least one safety switch to be closed when the backfeed switch opens.

In various examples, the at least one safety switch includes a relay having a first connection coupled between the converter input and the backfeed switch, and a second connection coupled to the return connection. In some examples, the at least one safety switch includes at least one power-factor-correction (PFC) boost switch. In one example, the PFC boost switch is configured to provide power-factor correction to input power received at the input power connection. In various examples, closing the at least one safety switch couples the converter input to neutral. In some examples, the power system includes an inverter coupled to the power converter, an output connection, and at least one inverter switch coupled between the inverter and the output connection. In one example, the at least one control circuit is further configured to determine, while the at least one safety switch is closed, a voltage at the converter input, and open the at least one inverter switch responsive to determining that the voltage exceeds a voltage threshold.

In various examples, the power system includes a second input power connection, and a bypass switch having a first connection coupled to the second input power connection and a second connection coupled between the at least one inverter switch and the output connection. In some examples, the at least one safety switch is configured to open when the backfeed switch closes. In one example, the at least one control circuit is further configured to determine, while the at least one safety switch is closed, a voltage at the converter input, and shut down the power system responsive to determining that the voltage exceeds a voltage threshold. In various examples, the backfeed switch includes at least one backfeed relay.

According to at least one aspect of the disclosure, a method of operating a power system having an input power connection, a return connection, a power converter having a converter input, a backfeed switch coupled between the input power connection and the converter input, and at least one safety switch coupled between the converter input and the return connection is provided, the method comprising, opening the backfeed switch to disconnect the converter input from the input power connection, and closing the at least one safety switch responsive to opening the backfeed switch to connect the converter input to the return connection.

In various examples, the at least one safety switch includes at least one power-factor-correction (PFC) boost switch and the method further comprises providing, by the PFC boost switch, power-factor correction to input power received at the input power connection. In some examples, closing the at least one safety switch couples the converter input to neutral. In one example, the power system includes an inverter coupled to the power converter, an output connection, and at least one inverter switch coupled between the inverter and the output connection, and the method includes determining, while the at least one safety switch is closed, a voltage at the converter input, and opening the at least one inverter switch responsive to determining that the voltage exceeds a voltage threshold. In various examples, the method includes opening the at least one safety switch when the backfeed switch closes. In some examples, the method includes determining, while the at least one safety switch is closed, a voltage at the converter input, and shutting down the power system responsive to determining that the voltage exceeds a voltage threshold.

According to at least one aspect of the disclosure, a non-transitory computer-readable medium storing thereon sequences of computer-executable instructions for operating a power system having an input power connection, a return connection, a power converter having a converter input, a backfeed switch coupled between the input power connection and the converter input, and at least one safety switch coupled between the converter input and the return connection is provided, the sequences of computer-executable instructions including instructions that instruct at least one processor to open the backfeed switch to disconnect the converter input from the input power connection, and close the at least one safety switch responsive to opening the backfeed switch to connect the converter input to the return connection.

In various examples, the power system includes an inverter coupled to the power converter, an output connection, and at least one inverter switch coupled between the inverter and the output connection, and the instructions further instruct the at least one processor to determine, while the at least one safety switch is closed, a voltage at the converter input, and open the at least one inverter switch responsive to determining that the voltage exceeds a voltage threshold. In some examples, the instructions further instruct the at least one processor to determine, while the at least one safety switch is closed, a voltage at the converter input, and shut down the power system responsive to determining that the voltage exceeds a voltage threshold.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
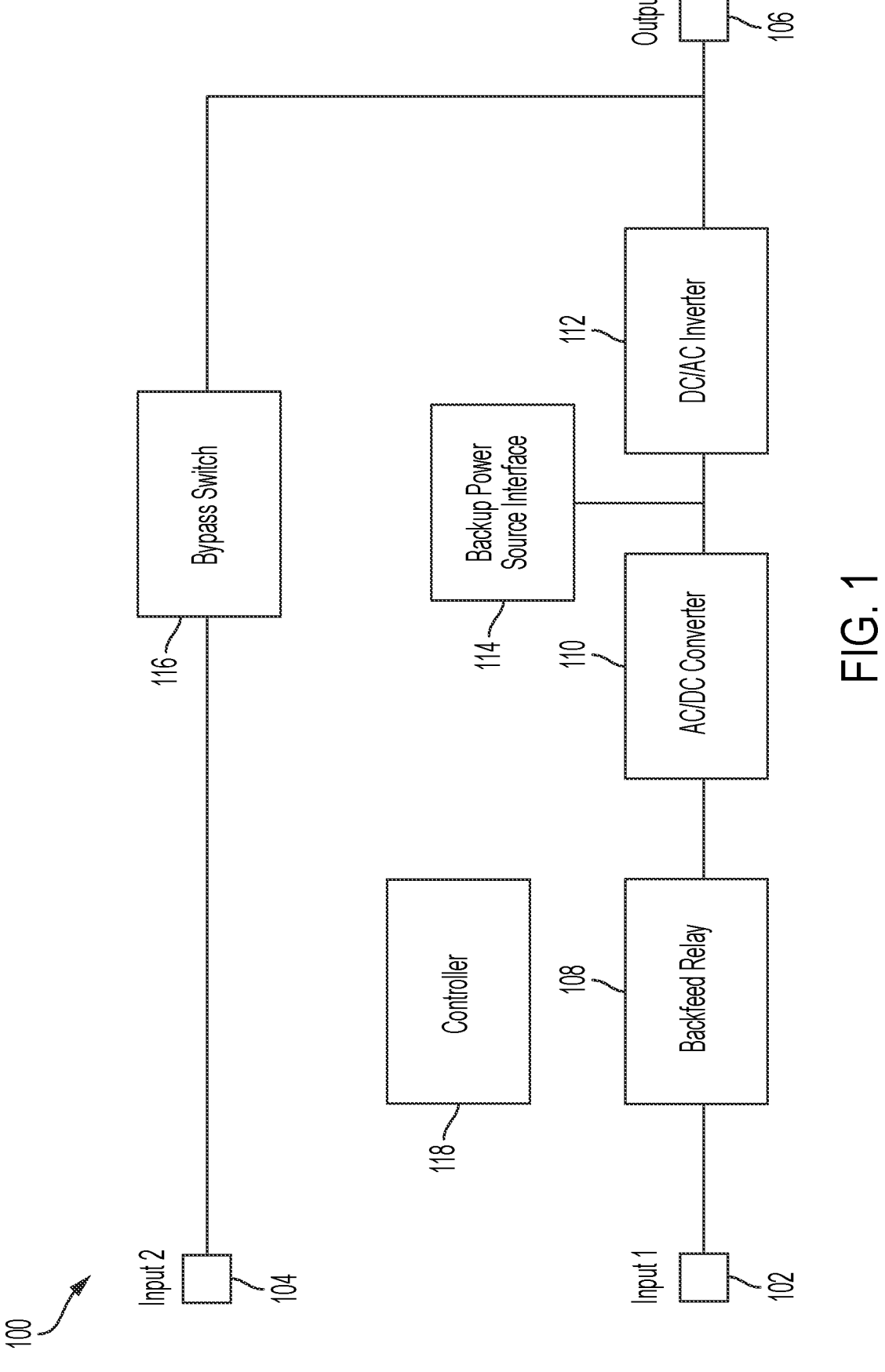
FIG. 1 illustrates a block diagram of a power system according to an example.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

As discussed above, uninterruptible power supplies (UPSs) may be used to provide uninterrupted power to one or more loads. UPSs may be connected to multiple power sources. For example, a UPS may be connected to a primary power source, such as a mains utility supply, and a secondary power source, such as an energy-storage device. When power is available from the primary power source, the UPS may draw power from the primary power source to power one or more loads. When power is not available from the primary power source, the UPS may instead draw power from the secondary power source to power one or more loads.

Some UPSs may include backfeed-protection circuitry, such as a backfeed relay. A backfeed relay may be configured to prevent power from being provided in the "wrong" direction. For example, the UPS may be configured to draw power from the primary power source, but not to provide power to the primary power source. Nonetheless, it may be possible (albeit undesirable) for the UPS to inadvertently provide power back to the primary power source, such as when power is not being drawn from the primary power source. A backfeed relay coupled to a connection from which the UPS connects to the primary power source may thus be open and non-conducting when power is not being drawn from the primary power source. The open backfeed relay may prevent backfeed power from being provided back to the primary power source.

To illustrate the foregoing, FIG. 1 illustrates a block diagram of a power system 100 according to an example. The power system 100 may be or include a UPS. The power system 100 includes a first input 102, a second input 104, an output 106, a backfeed relay 108, an AC/DC converter 110, a DC/AC inverter 112, a backup power source interface 114, at least one bypass switch 116 ("bypass switch 116"), and at least one controller 118 ("controller 118"). The first input 102 and the second input 104 may each be configured to be coupled to a primary power source, such as a utility mains. The output 106 may be configured to be coupled to at least one load ("load"). The backup power source interface 114 may be configured to be coupled to at least one energy-storage device, such as a battery. The power system 100 may include additional components or features, such as a return connection, which are not illustrated for purposes of brevity.

The load may have certain power-quality requirements for power received from the output 106, such as the output-power AC voltage remain within a range of acceptable voltage values. If the power provided by the primary power source does not meet those requirements without power conditioning, then the controller 118 may open the bypass switch 116 and close the backfeed relay 108 to draw power from the first input 102 but not the second input 104. The controller 118 may operate the AC/DC converter 110 to draw AC power from the first input 102, convert the AC power to DC power, and provide the DC power to the DC/AC inverter 112. In some examples, the AC/DC converter 110 is a power-factor-correction circuit configured to provide power-factor correction in the AC-to-DC conversion. The controller 118 may operate the DC/AC inverter 112 to draw DC power from the AC/DC converter 110, convert the DC power to AC power, and provide the AC power to the load via the output 106. In some examples, a portion of the DC power provided by the AC/DC converter 110 may be provided as recharging power to the at least one energy-storage device via the backup power source interface 114.

The power system 100 thus conditions the input power using the AC/DC converter 110 and/or the DC/AC inverter 112. Although the power received from the first input 102 may not have met the load power-quality requirements, the AC/DC converter 110 and/or the DC/AC inverter 112 may condition the power such that the power provided to the output 106 does meet the load power-quality requirements.

If the power provided by the primary power source does meet the load power-quality requirements without conditioning, then the controller 118 may close the bypass switch 116 and open the backfeed relay 108. By closing the bypass switch 116, the second input 104 is connected directly to the output 106. Power received at the second input 104 is thus provided directly to the output 106, bypassing the components 108-114, which may improve efficiency.

Opening the backfeed relay 108 may reduce a chance of power being provided "back" to the primary power source via the first input 102 (that is, "fed back" to the first input 102) when power is not being drawn from the first input 102. For example, if the backfeed relay 108 were omitted, power received at the second input 104 and intended for the output 106 may undesirably pass through the DC/AC inverter 112 and the AC/DC converter 110 to the primary power source via the first input 102. Accordingly, the backfeed relay 108 advantageously reduces a chance of power being unintentionally fed back into the primary power source.

In some examples, however, it may be possible for power to arc across the backfeed relay 108 even when the backfeed relay is open. For example, if a voltage at a connection between the backfeed relay 108 and the AC/DC converter 110 (that is, an output terminal of the backfeed relay 108) is too high, arcing may occur. For this reason, it may be desirable to implement the backfeed relay 108 with a minimum airgap distance to reduce a chance of arcing.

Examples of the disclosure provide systems and methods for reducing or eliminating a chance of arcing across a backfeed relay. In some examples, a connection between an output terminal of a backfeed relay and an input converter is switchably coupled to a return connection by one or more safety switches when the backfeed relay is open. The one or more safety switches and the backfeed relay may be switched in a complementary fashion. The return connection may be maintained at a neutral voltage while the one or more safety switches are closed. Accordingly, the output terminal of the backfeed relay may be maintained at the neutral voltage by the safety switches when the backfeed relay is open. By maintaining the output terminal of the backfeed relay at the neutral voltage, a chance of arcing across the open backfeed relay (which may be caused at least in part by a high voltage at the output terminal of a backfeed relay) is reduced or eliminated.

Figure 2:
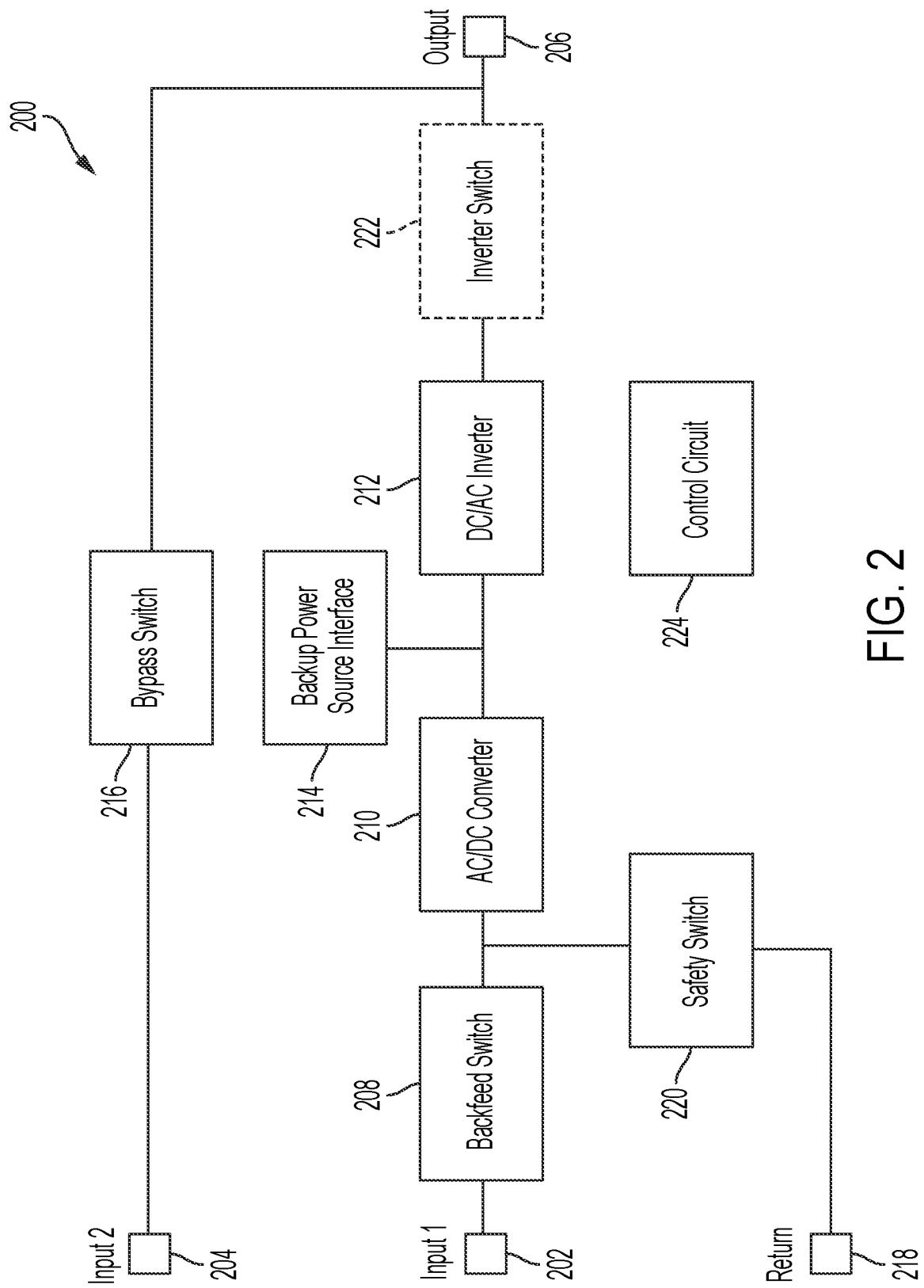
FIG. 2 illustrates a block diagram of a power system according to another example.

FIG. 2 illustrates a block diagram of a power system 200 according to an example. In some examples, the power system 200 is a multi-phase system, such as a three-phase system. However, FIG. 2 illustrates single connections between components for purposes of illustrative clarity.

The power system 200 includes at least one first input power connection 202 ("first input power connection 202"), at least one second input power connection 204 ("second input power connection 204"), at least one output 206 ("output 206"), at least one backfeed switch 208 ("backfeed switch 208"), an AC/DC converter 210, a DC/AC inverter 212, a backup power source interface 214, at least one bypass switch 216 ("bypass switch 216"), at least one return connection 218 ("return connection 218"), at least one safety switch 220 ("safety switch 220"), at least one optional inverter switch 222 ("inverter switch 222"), and at least one control circuit 224 ("control circuit 224").

The first input power connection 202 is coupled to the backfeed switch 208 and is configured to be coupled to a primary power source, such as a utility mains. The second input power connection 204 is coupled to the bypass switch 216 and is configured to be coupled to a primary power source, such as a utility mains, which may be the same power source or a different power source than that to which the first input power connection 202 is configured to be coupled. The output 206 is coupled to the bypass switch 216 and is configured to be coupled to one or more loads ("load"). In examples in which the optional inverter switch 222 is included, the output 206 is also coupled to the inverter switch 222. In examples in which the optional inverter switch 222 is omitted, the output 206 is coupled to the DC/AC inverter 212.

The backfeed switch 208, which may include a backfeed relay or other backfeed switching device, is coupled to the first input power connection 202 at an input terminal and is coupled to the AC/DC converter 210 and the safety switch 220 at an output terminal. The backfeed switch 208 is also communicatively coupled to the control circuit 224. The AC/DC converter 210 is coupled to the backfeed switch 208 and the safety switch 220 at an input connection, and is coupled to the DC/AC inverter 212 and the backup power source interface 214 at a second connection. The AC/DC converter 210 may also be coupled to the return connection 218 at a third connection, which is not illustrated for purposes of clarity. The AC/DC converter 210 is also communicatively coupled to the control circuit 224.

The DC/AC inverter 212 is coupled to the AC/DC converter 210 and the backup power source interface 214 at a first connection. In examples in which the optional inverter switch 222 is included, the DC/AC inverter 212 is coupled to the inverter switch 222 at a second connection. In examples in which the optional inverter switch 222 is not included, the DC/AC inverter 212 is coupled to the output 206 at a second connection. The DC/AC inverter 212 is also communicatively coupled to the control circuit 224.

The backup power source interface 214 is coupled to the AC/DC converter 210 and the DC/AC inverter 212 and is configured to be coupled to one or more backup-power sources, such as one or more batteries. The backup power source interface 214 may also be communicatively coupled to the control circuit 224. The bypass switch 216 is coupled to the second input power connection 204 at a first connection and is coupled to the output 206 at a second connection. The bypass switch 216 is also communicatively coupled to the control circuit 224. The return connection 218 is coupled to the safety switch 220 and is configured to be coupled to a return of at least one primary power source. The safety switch 220 is coupled to the backfeed switch 208 and the AC/DC converter 210 at a first connection and is coupled to the return connection 218 at a second connection. The safety switch 220 is also communicatively coupled to the control circuit 224.

The inverter switch 222 is coupled to the DC/AC inverter 212 at a first connection, and is coupled to the output 206 at a second connection. The inverter switch 222 is also communicatively coupled to the control circuit 224. The control circuit 224 is communicatively coupled to the backfeed switch 208, the AC/DC converter 210, the DC/AC inverter 212, the backup power source interface 214, the bypass switch 216, the safety switch 220, and the inverter switch 222. The control circuit 224 may also include or be communicatively coupled to one or more sensors, such as one or more voltage sensors coupled to an input of the AC/DC converter 210.

The components 202-216 may be substantially similar to the components 102-116. For example, the backfeed switch 208—which may include a backfeed relay, similar to the backfeed relay 108—may be configured to be open and non-conducting when power is not being drawn from the first input power connection 202. Furthermore, to reduce a chance of arcing across the backfeed switch 208 while the backfeed switch 208 is open, the safety switch 220 may be closed to couple the output terminal of the backfeed switch 208 to the return connection 218 when the backfeed switch 208 is open. The return connection 218 may be a neutral connection at a neutral voltage. Accordingly, while the safety switch 220 is closed, the output terminal of the backfeed switch 208 may be maintained at a neutral voltage to reduce a chance of arcing. The safety switch 220 and the backfeed switch 208 may be operated in a complementary fashion such that, when one of the switches 208, 220 is closed, the other of the switches 220, 208 is open.

Furthermore, as discussed in greater detail below with respect to FIGS. 5 and 6, the inverter switch 222 may be operated to further reduce a chance of arcing. When the safety switch 220 is closed, it may be expected that the voltage at a node between the backfeed switch 208 and the AC/DC converter 210 is at the voltage of the return connection 218, which may be a neutral (that is, zero) voltage. If the voltage at the node is not at the voltage of the return connection 218, this overvoltage condition may be indicative of a malfunction of one or more components of the power system 200. For example, one or more diodes in one or both of the AC/DC converter 210 and/or the DC/AC inverter 212 may be conducting a reverse current, the safety switch 220 may not be closing as expected, or another malfunction may exist. It may be desirable to shut the power system 200 down if such a malfunction exists. Accordingly, the control circuit 224 may monitor a voltage at the node between the backfeed switch 208 and the AC/DC converter 210 and, if the voltage falls outside an expected range (for example, by being greater than 10 V where a voltage of 0 V is expected), the control circuit 224 may shut the power system 200 down.

Figure 3:
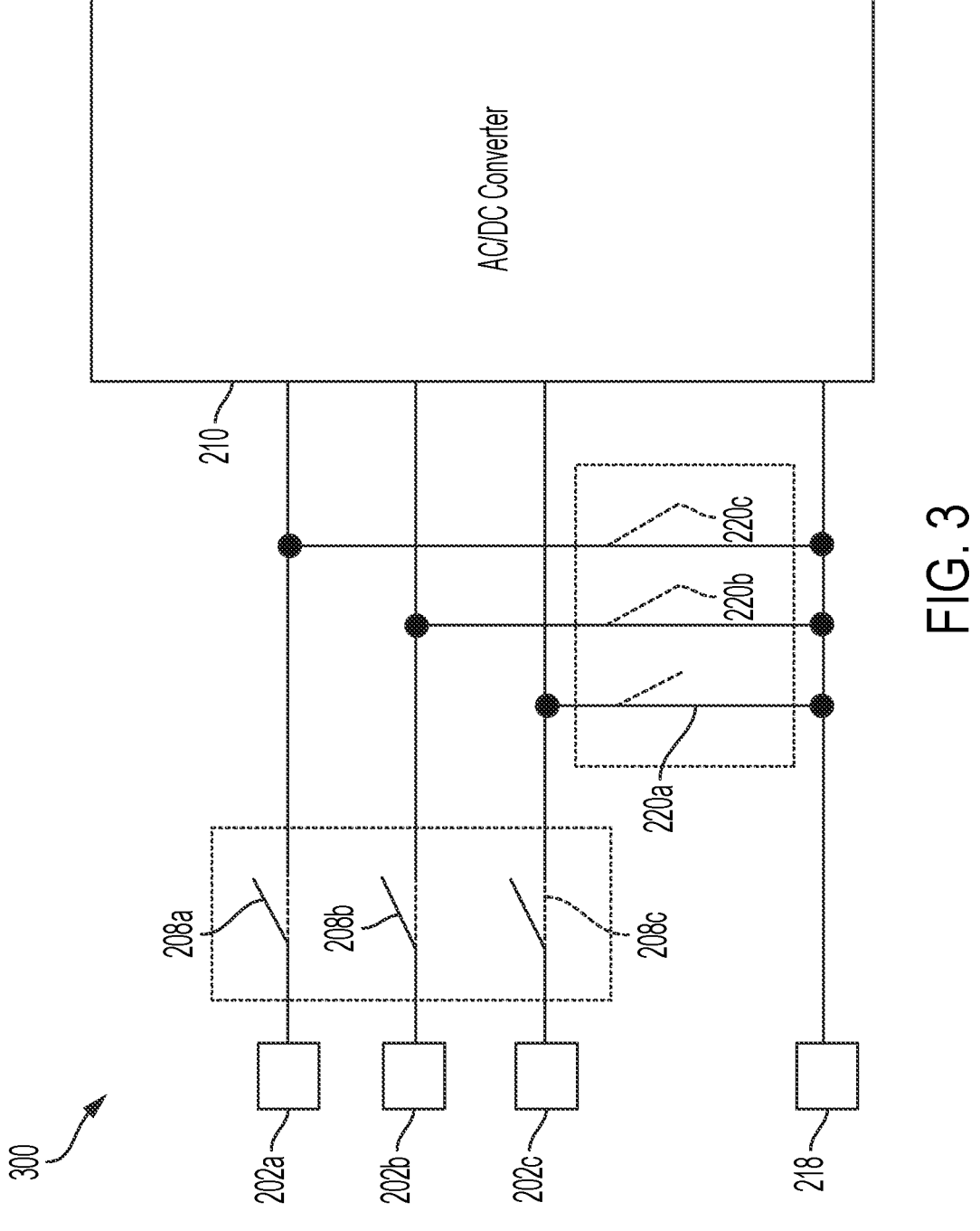
FIG. 3 illustrates a schematic diagram of an input section of a power system according to an example.

To illustrate operation of one example of the safety switch 220, FIG. 3 illustrates a schematic diagram of an input section 300 of a three-phase power system according to an example. The input section 300 may illustrate one example of aspects of the power system 200, and components are labeled accordingly.

The input section 300 includes a first input power connection 202a, a second input power connection 202b, a third input power connection 202c, a first backfeed switch 208a, a second backfeed switch 208b, a third backfeed switch 208c, an AC/DC converter 210, a return connection 218, a first safety switch 220a, a second safety switch 220b, and a third safety switch 220c. The input power connections 202a-202c may represent a three-phase example of the first input power connection 202. The backfeed switches 208a-208c may represent a three-phase example of the backfeed switch 208. The safety switches 220a-220c may represent a three-phase example of the safety switch 220.

Figure 4:
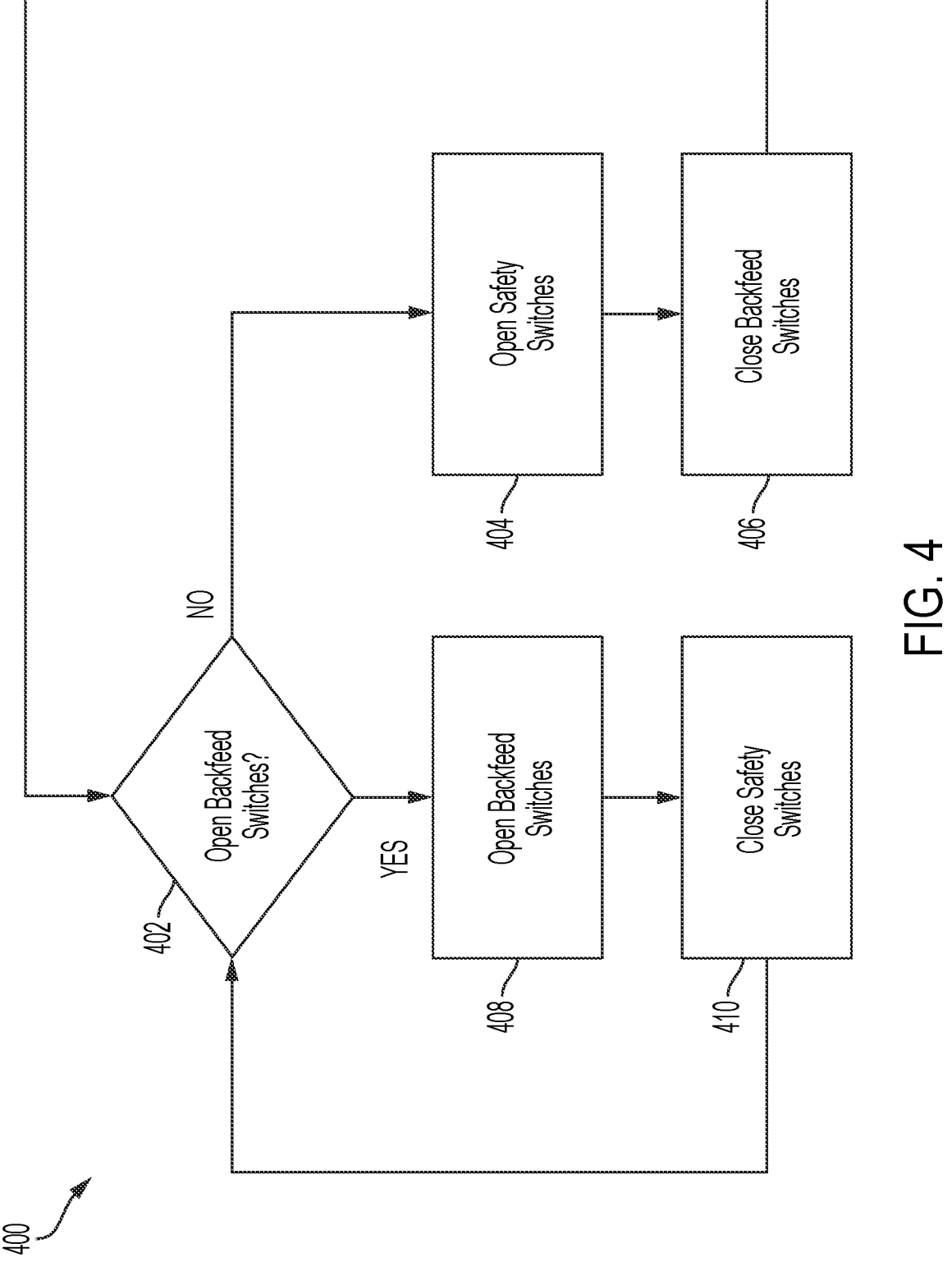
FIG. 4 illustrates a process of operating components of an input section of a power system according to an example.

FIG. 4 illustrates a process 400 of operating the input section 300 according to an example. The process 400 may be executed at least in part by the control circuit 224 in some examples.

At act 402, the control circuit 224 determines whether to open the backfeed switches 208a-208c. The backfeed switches 208a-208c may be maintained in an open position when power is not being drawn from the input power connections 202a-202c, and may be maintained in a closed position when power is being drawn from the input power connections 202a-202c. Power may be drawn from the input power connections 202a-202c when it is desirable to provide power to the AC/DC converter 210. Power may be provided to the AC/DC converter 210 where it is desirable to provide power to the backup power source interface 214 and/or to condition input power prior to providing output power to the output 206. Power may be provided to the backup power source interface 214 to provide a recharging current to an energy-storage device coupled to the backup power source interface 214. Input power may be conditioned (for example, by the AC/DC converter 210 and/or the DC/AC inverter 212) where the input power does not meet output-power requirements for the load. Power may also be provided to the AC/DC converter 210 for other reasons, such as if power is unavailable from other sources. Accordingly, if power is to be provided to the backup power source interface 214 and/or to the output 206 via the DC/AC inverter 212, then the backfeed switches 208a-208c may be closed.

If the control circuit 224 determines that the backfeed switches 208a-208c are not to be opened (402 NO), then the process 400 continues to act 404. Otherwise, if the control circuit 224 determines that the backfeed switches 208a-208c are to be opened (402 YES), then the process 400 continues to act 408.

At act 404, the control circuit 224 opens the safety switches 220a-220c. Opening the safety switches 220a-220c may include providing a control signal to the safety switches 220a-220c to control the safety switches 220a-220c to open. For example, the safety switches 220a-220c may include relays, and the control signal may be provided to a control terminal of the relays. Opening the safety switches 220a-220c decouples the AC/DC converter 210 from the return connection 218, thereby galvanically isolating the AC/DC converter 210 from the voltage of the return connection 218, which may be a neutral voltage in some examples.

At act 406, the control circuit 224 closes the backfeed switches 208a-208c. Closing the backfeed switches 208a-208c may include providing a control signal to the backfeed switches 208a-208c to control the backfeed switches 208a-208c to close. For example, the backfeed switches 208a-208c may include relays, and the control signal may be provided to a control terminal of the relays. Closing the backfeed switches 208a-208c couples the AC/DC converter 210 to the input power connections 202a-202c, thereby allowing input power received from a power source coupled to the input power connections 202a-202c to be provided to the AC/DC converter 210. In some examples, a time delay (for example, a deadband) is implemented between acts 404 and 406 to ensure that the safety switches 220a-220c are open before the backfeed switches 208a-208c are closed to prevent shorting the input power connections 202a-202c to the return connection 218.

The process 400 then returns to act 402. Acts 402-406 may thereafter be repeated provided that the control circuit 224 again determines that the backfeed switches 208a-208c are not to be opened. Accordingly, because the safety switches 220a-220c may already be open and the backfeed switches 208a-208c may already be closed from previous iterations of acts 402-406, subsequent executions of acts 404 and 406 may include maintaining the switches 208a-208c, 220a-220c in their respective states rather than transitioning to those states. Acts 402-406 may be repeated until, for example, the control circuit 224 determines that the backfeed switches 208a-208c are to be opened (402 YES), at which point the process 400 continues to act 408. For example, the control circuit 224 may determine that the backfeed switches 208a-208c are to be opened because input power is no longer to be drawn from the first input power connection 202, such as because acceptable input power is not available from the first input power connection 202.

At act 408, the control circuit 224 opens the backfeed switches 208a-208c. Opening the backfeed switches 208a-208c may galvanically isolate the AC/DC converter 210, thereby preventing power from being inadvertently fed back to the input power connections 202a-202c from the AC/DC converter 210. For example, the hypothetical backfeed power may originate from an energy-storage device coupled to the backup power source interface 214 and/or from a power source coupled to the second input power connection 204.

At act 410, the control circuit 224 closes the safety switches 220a-220c. Closing the safety switches 220a-220c couples the AC/DC converter 210 and the output terminals of the backfeed switches 208a-208c to the return connection 218, which may be maintained at a neutral voltage in some examples. In this example, therefore, the output terminals of the backfeed switches 208a-208c are maintained at a neutral voltage. A chance of arcing across the backfeed switches 208a-208c from the output terminals to the input terminals is therefore reduced by maintaining the output terminals at a low (that is, neutral in this example) voltage. In various examples, a time delay (for example, a deadband) is implemented between acts 408 and 410 to ensure that the backfeed switches 208a-208c are open before the safety switches 220a-220c are closed to prevent shorting the input power connections 202a-202c to the return connection 218. The process 400 then returns to act 402.

Accordingly, in this example, the control circuit 224 operates the backfeed switches 208a-208c in a complementary fashion with the safety switches 220a-220c. By operating the switches 208a-208c, 220a-220c in a complementary fashion, the output terminals of the backfeed switches 208a-208c may be maintained at a neutral voltage while the backfeed switches 208a-208c are open. Maintaining the output terminals of the backfeed switches 208a-208c at the neutral voltage reduces a chance of arcing across the backfeed switches 208a-208c from the output terminals to the input terminals.

The safety switches 220a-220c provide one example of the safety switch 220 in which the safety switch 220 is external to the AC/DC converter 210. In some examples, the safety switch 220 may be external to the AC/DC converter 210 but may be combined with one or more other components. For example, the safety switch 220 may be combined with the backfeed switch 208 in some examples. Whereas the switches 208a-208c, 220a-220c are illustrated as single-pole, single-throw switches in the example of FIG. 3, in other examples the switches 208a and 220a, 208b and 220b, and 208c, 220c may each be combined and implemented as single-pole, double-throw (SPDT) switches. For example, a first SPDT switch may be coupled to the first input power connection 202a at one throw, the return connection 218 at the other throw, and the AC/DC converter 210 at the single pole. A second SPDT switch may be coupled to the second input power connection 202b at one throw, the return connection 218 at the other throw, and the AC/DC converter 210 at the single pole. A third SPDT switch may be coupled to the third input power connection 202c at one throw, the return connection 218 at the other throw, and the AC/DC converter 210 at the single pole. The SPDT switches may accomplish operation similar to the complementary control of the switches 208a-208c. 220a-220c inasmuch as the AC/DC converter 210 is coupled, via a respective pole, to either the input power connections 202a-202c or the return connection 218 via one of the two respective throws.

Although the safety switch 220 is illustrated as being external to the AC/DC converter 210 in FIG. 2 for illustrative clarity, in some examples the safety switch 220 may be internal to the AC/DC converter 210. For example, the safety switch 220 may be or include a switching device that is already a component of the AC/DC converter 210. In one example, the safety switch 220 may also be a power-factor-correction (PFC) boost switch of the AC/DC converter 210.

Furthermore, as discussed above, in some examples the inverter switch 222 may be included to offer additional protection against arcing across the backfeed relay 208.

Figure 5:
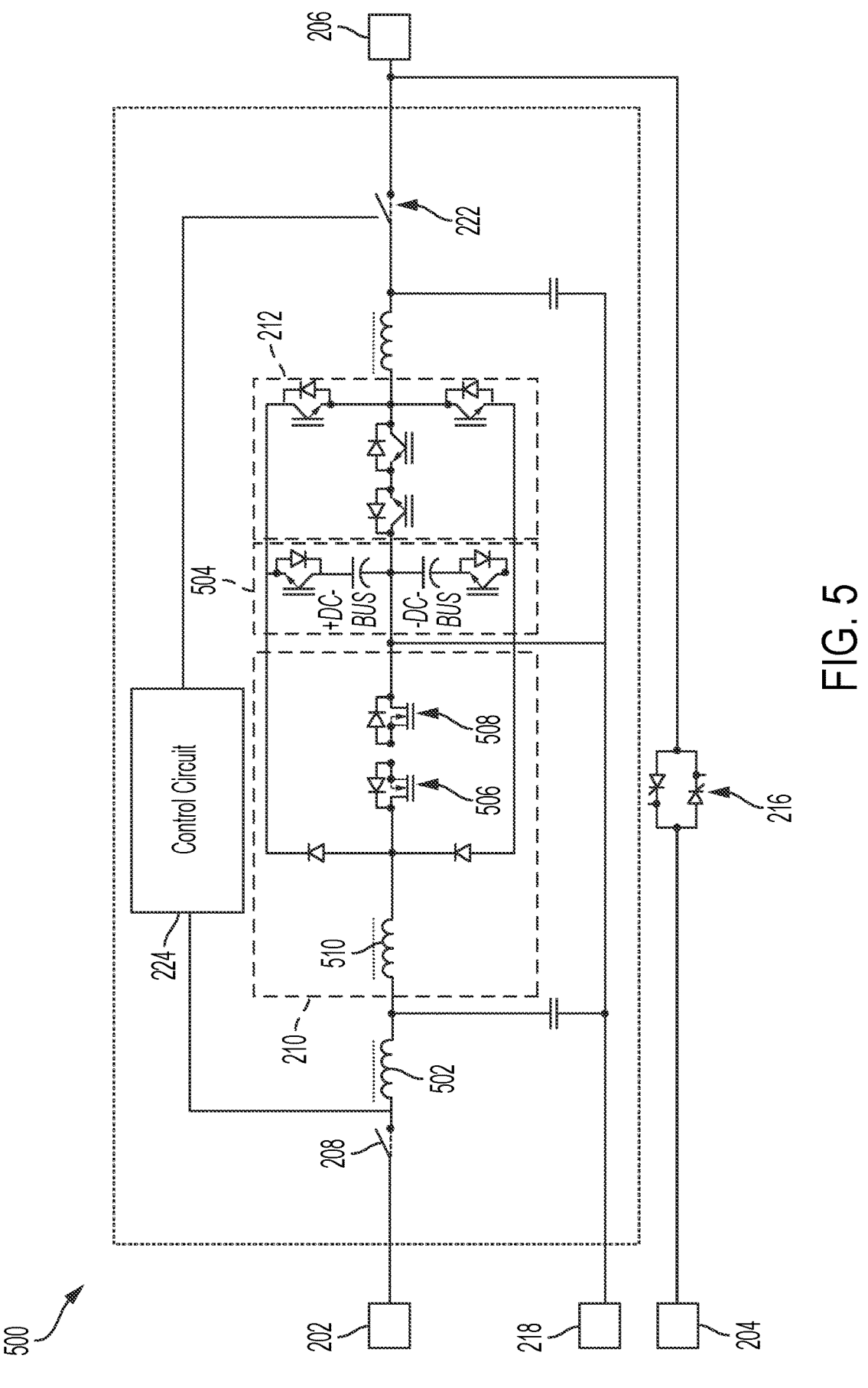
FIG. 5 illustrates a schematic diagram of a power system according to an example.

FIG. 5 illustrates a schematic diagram of a power system 500 according to an example. The power system 500 may illustrate one example of the power system 200. In some examples, the power system 500 illustrates an example of the power system 200 in which the power system 200 is a single-phase system. In other examples, the power system 500 illustrates an example of a portion of the power system 200 in which the power system 200 is a multi-phase system, of which the power system 500 is a single phase.

The power system 500 includes the first input power connection 202, the second input power connection 204, the output 206, the backfeed switch 208, the AC/DC converter 210, the DC/AC inverter 212, the bypass switch 216, the control circuit 224, an input inductor 502, and a DC-bus section 504. The power system 500 includes additional components not specifically labeled for purposes of brevity. Furthermore, the power system 500 may include additional features not illustrated. For example, the DC-bus section 504 may be, or may be coupled to, the backup power source interface 214 to exchange power with an energy-storage device. The AC/DC converter 210 may include, or be operated as, a power-factor-correction (PFC) circuit. Accordingly, the AC/DC converter 210 may include a first switch 506, a second switch 508, and a PFC inductor 510. As discussed below, one or both of the switches 506, 508 may act as the safety switch 220 at one point in time, and one or both of the switches 506, 508 may act as PFC boost switches at another point in time.

The input inductor 502 is coupled to the backfeed switch 208 at a first connection, and is coupled to the PFC inductor 510 at a second connection. The first switch 506 is coupled to the PFC inductor 510 at a first connection, and is coupled to the second switch 508 at a second connection. The first switch 506 may also be communicatively coupled to the control circuit 224 in some examples. The second switch 508 is coupled to the first switch 506 at a first connection, and is coupled to the return connection 218 at a second connection. The second switch 508 may also be communicatively coupled to the control circuit 224 in some examples.

The control circuit 224 is communicatively coupled to the backfeed switch 208 and the inverter switch 222. In some examples, the control circuit 224 may be communicatively coupled to the switches 506, 508. In various examples, the control circuit 224 may be coupled to one or more sensors. For example, the control circuit 224 may be coupled to one or more voltage sensors configured to sense a voltage at any of various points in the power system 500 including, for example, a node between the backfeed switch 208 and the input inductor 502, a node between the input inductor 502 and the PFC inductor 510, or one or more other nodes.

As appreciated by one of skill in the art, when input power is drawn from the first input power connection 202 via the closed backfeed switch 208, the AC/DC converter 210 may be operated as a PFC circuit to provide power-factor correction to the input power. The AC/DC converter 210 outputs the power-factor-corrected DC power to the DC-bus section 504, which may store DC power in DC-bus capacitors. As discussed above, the DC-bus section 504 may be coupled to one or more energy-storage devices and may provide at least a portion of the DC power to the energy-storage devices. The DC/AC inverter 212 may draw DC power from the DC-bus section 504, invert the DC power to produce AC power, and provide the AC power to the output 206 via the closed inverter switch 222. In some examples, the control circuit 224 operates the components of the AC/DC converter 210, the DC-bus section 504, and the DC/AC inverter 212 to perform these functions. In other examples, an additional or different controller may perform these functions as discussed below, whereas the control circuit 224 may control only the switches 208, 222.

Figure 6:
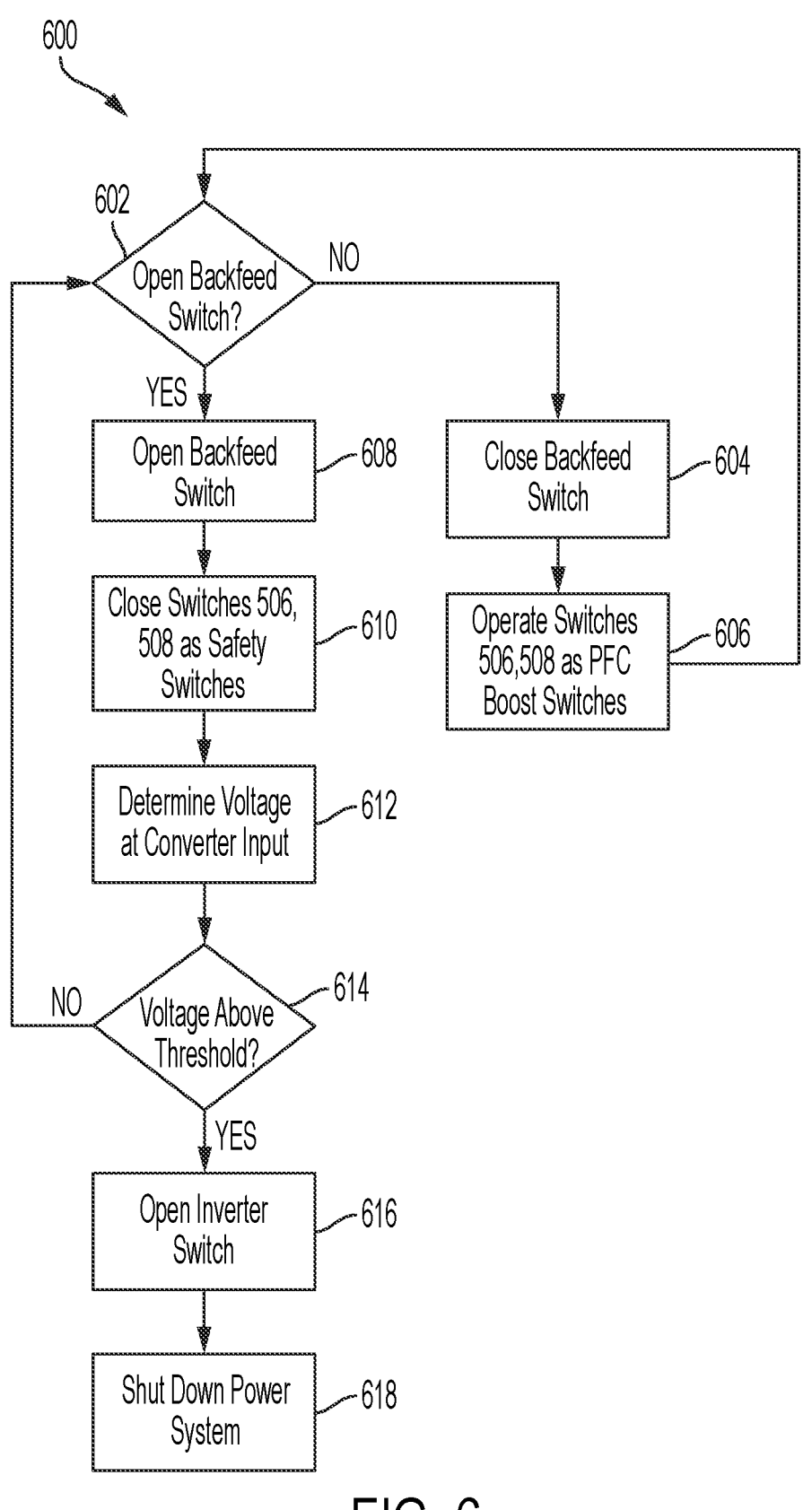
FIG. 6 illustrates a process of operating a power system according to an example.

FIG. 6 illustrates a process 600 of operating the power system 500 according to an example. In various examples, the process 600 may be executed by the control circuit 224. In some examples, one or more acts of the process 600 may be executed by the control circuit 224, and remaining acts of the process 600 may be executed by an additional or different controller. For purposes of example, the process 600 will be described according to an example in which the control circuit 224 executes the process 600.

At act 602, the control circuit 224 determines whether to open the backfeed switch 208. The backfeed switch 208 may be maintained in an open position when power is not being drawn from the first input power connection 202, and may be maintained in a closed position when power is being drawn from the first input power connection 202. Power may be drawn from the first input power connection 202 when it is desirable to provide power to the AC/DC converter 210. For example, power may be provided to the AC/DC converter 210 where it is desirable to provide power to one or more loads coupled to the output 206 and/or one or more energy-storage devices coupled to the DC-bus section 504. Accordingly, if power is to be provided to the AC/DC converter 210, then the backfeed switch 208 may be closed.

If the control circuit 224 determines that the backfeed switch 208 is not to be opened (602 NO), then the process 400 continues to act 604. Otherwise, if the control circuit 224 determines that the backfeed switch 208 is to be opened (602 YES), then the process 600 continues to act 608.

At act 604, the control circuit 224 closes the backfeed switch 208. Because the control circuit 224 determined that power is to be drawn from the first input power connection 202 (602 NO), the backfeed switch 208 is closed to enable the AC/DC converter 210 to draw power from the first input power connection 202. The AC/DC converter 210 is thus coupled to the first input power connection 202 via the backfeed switch 208 and the input inductor 502. The control circuit 224, and/or another control circuit, may then control the AC/DC converter 210 to draw AC power from the first input connection 202 via the closed backfeed switch 208. For example, controlling the AC/DC converter 210 to draw AC power may include operating the switches 506, 508 as PFC boost switches.

At act 606, the control circuit 224 operates the switches 506, 508 as PFC boost switches, that is, to provide power-factor correction to input power received from the first input power connection 202. In this state, the power system 500 operates in a normal mode of operation in which the components 210, 504, 212 draw power from the first input power connection 202, condition the power, and provide output power to one or more loads via the output 206. The power system 500 may additionally or alternatively provide power (for example, a recharging current) to one or more energy-storage devices coupled to the DC-bus section 504. In some examples, the components 210, 504, 212 may be controlled by an additional or different control circuit (including, for example, a controller) other than, or in addition to, the control circuit 224.

The process 600 then returns to act 602. Acts 602-606 may thereafter be repeated provided that the control circuit 224 again determines that the backfeed switch 208 is not to be opened (602 NO). Accordingly, because the backfeed switch 208 may already be closed and the switches 506, 508 may already be operated as PFC boost switches from previous iterations of acts 602-606, acts 604 and 606 may include continuing to operate the switches 208, 506, 508 in their respective states rather than transitioning to those states. Acts 602-606 may be repeated until, for example, the control circuit 224 determines that the backfeed switch 208 is to be opened (602 YES), at which point the process 600 continues to act 608. For example, the control circuit 224 may determine that the backfeed switch 208 is to be opened because input power is no longer to be drawn from the first input power connection 202, such as because acceptable input power is not available from the first input power connection 202.

At act 608, the control circuit 224 controls the backfeed switch 208 to be open. Because power is no longer being drawn from the first input power connection 202, the backfeed switch 208 is opened to prevent power from being fed back to a power supply coupled to the first input power connection 202.

At act 610, the control circuit 224 controls the switches 506, 508 as safety switches and closes the switches 506, 508. Closing the switches 506, 508 couples the return connection 218 to the output terminal of the backfeed switch 208 via the inductors 502, 510. Accordingly, the switches 506, 508 act as the safety switch 220 by coupling the backfeed switch 208 to the return connection 218 (which may, in some examples, be maintained at a neutral voltage) when power is not being drawn from the first input power connection 202. Moreover, because no power is being drawn from the first input power connection 202, it is not necessary to operate the switches 506, 508 as PFC boost switches. The switches 506, 508 may otherwise be idle while not being operated as PFC boost switches; accordingly, operating the switches 506, 508 as safety switches while the backfeed switch 208 is open may advantageously improve backfeed protection without increasing a component count of the AC/DC converter 210 (that is, because the switches 506, 508 are already present in the AC/DC converter 210) and without substantially impacting operation of the AC/DC converter 210.

At act 612, the control circuit 224 determines a voltage at an input of the AC/DC converter 210. For example, the voltage may be a voltage at a node between the backfeed switch 208 and the input inductor 502, a voltage at a node between the input inductor 502 and the PFC inductor 510, and/or one or more other nodes. As discussed above, the control circuit 224 may be coupled to one or more voltage sensors which may be configured to sense a voltage at one or more nodes. Because the switches 506, 508 are controlled to be closed, a voltage at the input of the AC/DC converter 210 may be expected to be at the voltage of the return connection 218 which, in various examples, may be a neutral (that is, zero) voltage.

At act 614, the control circuit 224 determines whether the voltage determined at act 612 exceeds a voltage threshold. For example, the voltage threshold may be approximately 10 V in one example. As discussed above, the voltage determined at act 612 may be expected to be neutral, that is, zero. If the voltage is not at or near zero (for example, by exceeding 10 V) despite the switches 506, 508 being closed, the power system 500 may be experiencing a malfunction. For example, one or more diodes in the power system 500 (including, for example, PFC diodes in the AC/DC converter 210) may be malfunctioning and conducting a reverse current giving rise to the abnormally high voltage. If the control circuit 224 determines that the voltage does not exceed the voltage threshold (614 NO), then the process 600 returns to act 602. However, if the control circuit 224 determines that the voltage does exceed the voltage threshold (614 YES), then the process 600 continues to act 616.

At act 616, the control circuit 224 opens the inverter switch 222. Opening the inverter switch 222 isolates the AC/DC converter 210, the DC-bus section 504, and the DC/AC inverter 212 from the second input power connection 204. Opening the inverter switch 222 may further reduce a chance of backfeeding, such as from the second input power connection 204 to the first input power connection 202. In examples in which the switches 208, 220 are relays, opening the switches 208, 222 increases a total air gap between the second input power connection 204 and the first input power connection 202 as compared to only opening one of the switches 208, 222. For example, if the switches 208, 220 are implemented as substantially similar relays, then opening the inverter switch 222 in addition to the backfeed switch 208 doubles the total air gap between the input power connections 202, 204 as compared to only opening the backfeed switch 208.

At act 618, the control circuit 224 shuts down the power system 500. Determining that the voltage exceeds the voltage threshold at act 614 (614 YES) may indicate a malfunction in the power system 500 for which maintenance is desirable or required before continuing to operate the power system 500. Accordingly, at act 618, the control circuit 224 shuts down the power system 500 to allow the potential malfunction to be addressed. Shutting down the power system 500 may include powering off some or all of the components of the power system 500. In some examples, some functionality, such as user-interface functionality, may remain operational to enable a user to identify and/or diagnose the potential malfunction.

In light of the foregoing, the safety switch 220 may enhance backfeed protection through any of various implementations. In some examples, the safety switch 220 includes one or more relay switches coupled between the return connection 218 and a node between the backfeed switch 208 and the AC/DC converter 210. The relay switches may be operated in a complementary fashion with the backfeed switch 208 to couple the node between the backfeed switch 208 and the AC/DC converter 210 to a neutral voltage when the backfeed switch 208 is open. In other examples, the safety switch 220 includes one or more PFC boost switches in the AC/DC converter 210 and coupled between the return connection 218 and the node between the backfeed switch 208 and the AC/DC converter 210. In this manner, although the PFC boost switches are internal to the AC/DC converter 210, the PFC boost switches may still be considered to be coupled between the input of the AC/DC converter 210 and the return connection 218. The PFC boost switches may be operated normally (that is, as PFC boost switches) when the power system 200 is operating the AC/DC converter 210 in a normal mode of operation (that is, where the AC/DC converter 210 is being controlled to provide power-factor correction to received AC power to yield power-factor-corrected DC power), and may be operated as safety switches (that is, opened complementarily with the backfeed switch 208) otherwise.

In various examples, the inverter switch 222 may be included to further enhance backfeed protection. The control circuit 224 may monitor a voltage at the node between the backfeed switch 208 and the AC/DC converter 210 while the backfeed switch 208 is open and the safety switch 220 is closed. If the voltage falls outside of an expected range of voltage values (for example, by being above 10 V in one example), then the control circuit 224 may open the inverter switch 222 to increase an air gap between an output terminal of the inverter switch 222 and an input terminal of the backfeed switch 208. Although the inverter switch 222 is illustrated in the power system 500, in other examples of the power system 500, the inverter switch 222 may be omitted (for example, by being replaced with a short circuit). Furthermore, although the example illustrated in the input section 300 does not illustrate the inverter switch 222, in various examples the inverter switch 222 may be implemented in a power system including the topology illustrated in FIG. 3. Although some examples are illustrated as single-phase or multi-phase examples, it is to be appreciated that the principles of the disclosure are applicable to single- and multi-phase implementations.

In some examples, the control circuit 224 includes one or more controllers. The one or more controllers may execute various operations discussed above. Using data stored in associated memory and/or storage, the one or more controllers may also execute one or more instructions stored on one or more non-transitory computer-readable media, which the one or more controllers may include and/or be coupled to, that may result in manipulated data. In some examples, the one or more controllers may include one or more processors or other types of controllers. In one example, the one or more controllers are or include at least one processor. In another example, the one or more controllers perform at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

In some examples, the control circuit 224 may include hardware logic components in addition to, or in lieu of, software components (for example, one or more controllers configured to execute stored instructions). For example, to control the inverter switch 222, the control circuit 224 may include at least one comparator configured to determine whether a voltage at the node between the backfeed switch 208 and the AC/DC converter 210 exceeds a threshold voltage. Sensing circuitry, such as one or more voltage sensors, may send a sense signal indicative of a voltage at the node to the at least one comparator. The at least one comparator may open the inverter switch 222 if the voltage exceeds the threshold voltage, or may provide a signal indicative of the overvoltage to one or more controllers. The one or more controllers may initiate the shutdown operations discussed above. In some examples, the threshold voltage may be 10 V. In other examples, the threshold voltage may be another value.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

15

16

What is claimed is:

1. A power system comprising:
an input power connection;
a return connection;
a power converter having a converter input;
a backfeed switch coupled between the input power connection and the converter input;
at least one safety switch coupled between the converter input and the return connection; and
at least one control circuit configured to:
    control opening of the backfeed switch to disconnect the converter input from the input power connection; and
    control closing of the at least one safety switch to connect the converter input to the return connection, wherein connecting the converter input to the return connection maintains the converter input at a neutral voltage responsive to opening the backfeed switch.

2. The power system of claim 1, wherein the at least one safety switch includes a relay having a first connection coupled between the converter input and the backfeed switch, and a second connection coupled to the return connection.

3. The power system of claim 1, wherein the at least one safety switch includes at least one power-factor-correction (PFC) boost switch.

4. The power system of claim 3, wherein the PFC boost switch is configured to provide power-factor correction to input power received at the input power connection.

5. The power system of claim 1, wherein closing the at least one safety switch couples the converter input to a voltage of the return connection while the backfeed switch is open, and wherein the voltage of the return connection is the neutral voltage.

6. The power system of claim 1, further comprising:
an inverter coupled to the power converter;
an output connection; and
at least one inverter switch coupled between the inverter and the output connection.

7. The power system of claim 6, wherein the at least one control circuit is further configured to:
    determine, while the at least one safety switch is closed, a voltage at the converter input; and
    open the at least one inverter switch responsive to determining that the voltage exceeds a voltage threshold.

8. The power system of claim 6, further comprising:
a second input power connection; and
a bypass switch having a first connection coupled to the second input power connection and a second connection coupled between the at least one inverter switch and the output connection.

9. The power system of claim 1, wherein the at least one safety switch is configured to open when the backfeed switch closes.

10. The power system of claim 1, wherein the at least one control circuit is further configured to:
    determine, while the at least one safety switch is closed, a voltage at the converter input; and
    shut down the power system responsive to determining that the voltage exceeds a voltage threshold.

11. The power system of claim 1, wherein the backfeed switch includes at least one backfeed relay.

12. A method of operating a power system having an input power connection, a return connection, a power converter having a converter input, a backfeed switch coupled between the input power connection and the converter input, and at least one safety switch coupled between the converter input and the return connection, the method comprising:
    opening the backfeed switch to disconnect the converter input from the input power connection; and
    closing the at least one safety switch to connect the converter input to the return connection, wherein connecting the converter input to the return connection maintains the converter input at a neutral voltage responsive to opening the backfeed switch.

13. The method of claim 12, wherein the at least one safety switch includes at least one power-factor-correction (PFC) boost switch, and wherein the method further comprises providing, by the PFC boost switch, power-factor correction to input power received at the input power connection.

14. The method of claim 13, wherein closing the at least one safety switch couples the converter input to a voltage of the return connection while the backfeed switch is open, and wherein the voltage of the return connection is the neutral voltage.

15. The method of claim 12, wherein the power system includes an inverter coupled to the power converter, an output connection, and at least one inverter switch coupled between the inverter and the output connection, the method further comprising:
    determining, while the at least one safety switch is closed, a voltage at the converter input; and
    opening the at least one inverter switch responsive to determining that the voltage exceeds a voltage threshold.

16. The method of claim 12, further comprising opening the at least one safety switch when the backfeed switch closes.

17. The method of claim 12, further comprising:
    determining, while the at least one safety switch is closed, a voltage at the converter input; and
    shutting down the power system responsive to determining that the voltage exceeds a voltage threshold.

18. A non-transitory computer-readable medium storing thereon sequences of computer-executable instructions for operating a power system having an input power connection, a return connection, a power converter having a converter input, a backfeed switch coupled between the input power connection and the converter input, and at least one safety switch coupled between the converter input and the return connection, the sequences of computer-executable instructions including instructions that instruct at least one processor to:
    open the backfeed switch to disconnect the converter input from the input power connection; and
    close the at least one safety switch to connect the converter input to the return connection, wherein connecting the converter input to the return connection maintains the converter input at a neutral voltage responsive to opening the backfeed switch.

19. The non-transitory computer-readable medium of claim 18, wherein the power system includes an inverter coupled to the power converter, an output connection, and at least one inverter switch coupled between the inverter and the output connection, and wherein the instructions further instruct the at least one processor to:
    determine, while the at least one safety switch is closed, a voltage at the converter input; and
    open the at least one inverter switch responsive to determining that the voltage exceeds a voltage threshold.

20. The non-transitory computer-readable medium of claim 18, wherein the instructions further instruct the at least one processor to:

determine, while the at least one safety switch is closed, a voltage at the converter input; and shut down the power system responsive to determining that the voltage exceeds a voltage threshold.

\* \* \* \* \*